United States Patent

[11] 3,611,110

[72] Inventors Colin Douglas Corbey
London;
Robert Davies, Copthorne, both of England

[21] Appl. No. 1,626
[22] Filed Jan. 9, 1970
[45] Patented Oct. 5, 1971
[73] Assignee U.S. Philips Corporation
New York, N.Y.
[32] Priority Jan. 10, 1969
[33] Great Britain
[31] 1564/69

[54] VARACTOR MULTIPLIER COMPRISING PARALLEL SELF-BIASING RESISTOR AND NONLINEAR RESISTANCE CIRCUIT
4 Claims, 5 Drawing Figs.

[52] U.S. Cl. 321/69 NL, 307/88.3, 330/4.9
[51] Int. Cl. H02m 5/06, H03f 7/00
[50] Field of Search 321/69 W, 69 NL; 330/88.3, 4.9; 307/88.3

[56] References Cited

UNITED STATES PATENTS

| | | | |
|---|---|---|---|
| 3,287,621 | 11/1966 | Weaver | 321/69 NL |
| 3,358,215 | 12/1967 | Swan | 321/69 NL |
| 3,376,495 | 4/1968 | Leonard | 321/69 NL |

OTHER REFERENCES

Sylvania Varactor Handbook, Received Aug. 7, 1967 Page 13 Relied Upon Copy in 321-69 N/L

*Primary Examiner*—Gerald Goldberg
*Attorney*—Frank R. Trifari

ABSTRACT: A varactor frequency multiplier has a self-biasing resistor and a nonlinear resistance circuit to control the output power. The nonlinear circuit features a series circuit of a resistor, diode, and source of reverse bias. By properly selecting the values of the resistors a constant, or other desired output power function can be obtained.

INVENTORS.
COLIN D. CORBEY
ROBERT DAVIES
BY
ATTORNEY

INVENTORS
COLIN D. CORBEY
ROBERT DAVIE
BY
Frank R. [signature]
ATTORNEY

VARACTOR MULTIPLIER COMPRISING PARALLEL SELF-BIASING RESISTOR AND NONLINEAR RESISTANCE CIRCUIT

The instant invention relates to frequency multiplication towards or at microwave frequencies or higher by means of the type of nonlinear elements known as varactors. These solid-state devices have a voltage-dependent capacitance over a range of reverse bias voltages.

Their nonlinearity at such high frequencies and their consequent suitability for harmonic generation thereat is all the more interesting and useful to centimeter and millimeter wave workers because the cost of other generators, especially with electronic and temperature stabilization at these frequencies rises rapidly with frequency of operation. Thus multiplying the output frequency of a lower frequency generator is an attractive proposition.

Varactors can be used for doubling, tripling, quadrupling, or even higher multiplication factors are possible. Their power conversion efficiency varies with the magnitude of reverse bias, the best efficiency at different orders of multiplication generally being for different bias voltages.

An interesting prior discovery has been that often no auxiliary voltage source for reverse bias is necessary, since the DC voltage produced by diode rectification (the varactor is a diode) of the input signal can be employed as the bias source. This invention is applicable specifically to such self-biassed varactor multipliers.

A problem arises when a constant power (multiplied) output signal is required when the input signal fluctuates in power. Clearly the problem can be at least partially solved by arranging that the self-bias voltage or some other parameter be altered compensatingly in automatic response to sensed variations in output power, but this involves very expensive and cumbersome, bulky equipment indeed and additional energy loss, due to insertion of the appropriate compensators. Such servo-type compensators frequently 'hunt,' or have slow response times, either of which can be very undesirable.

The use of self-bias is preferred to external bias because of the simpler circuitry required and reduction in cost due to removal of P.S.V., and the extended dynamic range (of powers handled) available, and the primary object of the invention is to reduce or control the output power dependence on the input power to a self-biassed varactor multiplier without necessarily servoing a sensed version of the output by an external detector, i.e., the varactor in the multiplier is employed as its own detector.

According to the invention the object is fulfilled by arranging that the resistance providing the self-biassing facility be shunted by a nonlinear resistor, conveniently a diode and a voltage source in series, a resistance also being usually necessary in series therewith. The voltage of the source is suitably directed so as to bias the nonlinear resistor to an open circuit or high resistance condition but being small enough to an open circuit or high resistance condition but being small enough to be overcome at the desired operating power by the voltage developed across the varactor's self-biassing resistance.

Further objects, features and advantages of the invention will become apparent from the following description of an embodiment thereof, given by way of example, in conjunction with the accompanying drawings which show the embodiment and four performance graphs thereof, specifically in which.

Figure 4:
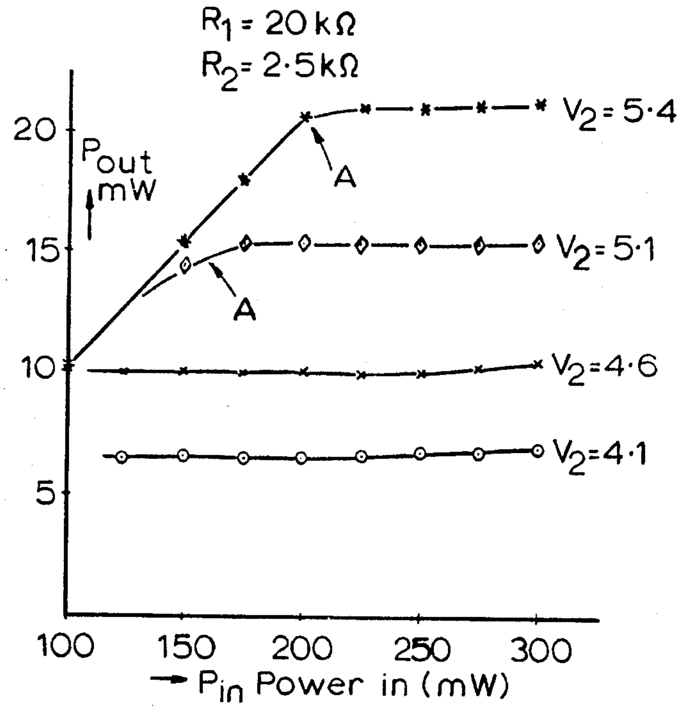
Figure 5:
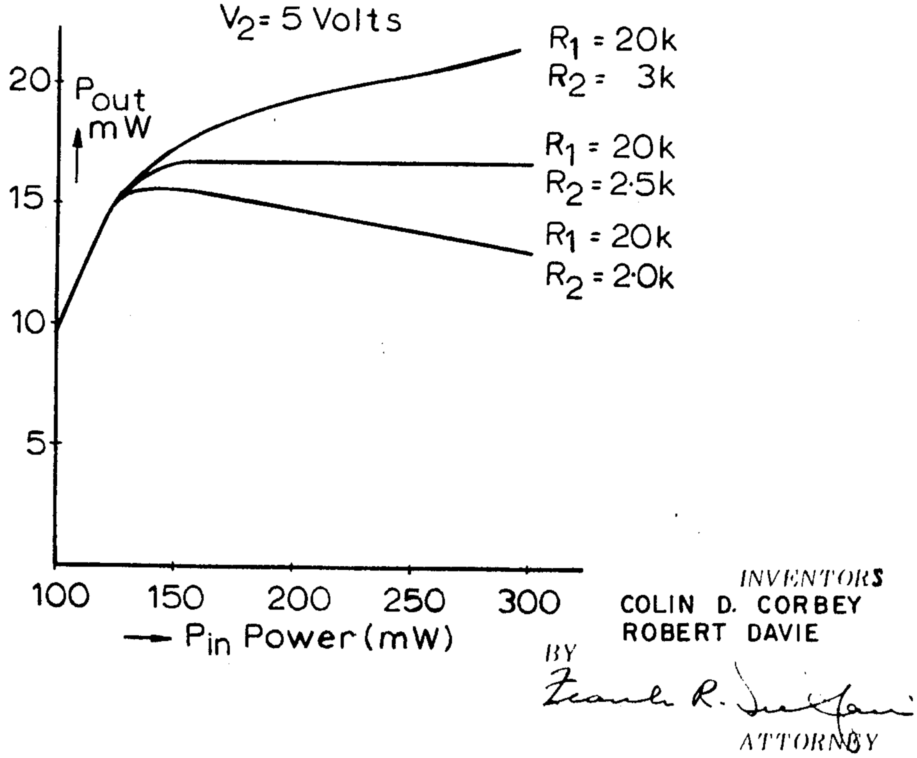

FIG. 4 graphs power output against power input for constant self bias resistance and series resistance, for four different values of backing voltage, showing that at these four values the power output remains sensibly constant at different levels over a very considerable range of input powers;

FIG. 5 shows a further three plots of output v input power, this time for constant backing voltage and self bias resistance, the series resistance being reset for each graph.

Figure 1:
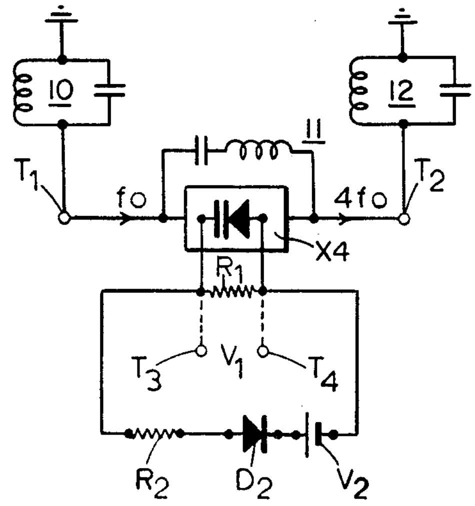
FIG. 1 shows a circuit diagram of a backing voltage, diode, and series resistance compensator according to the invention.

Referring to FIG. 1, a varactor quadrupler consisting of a stepped input resonant circuit 10 to match a 50Ω source impedance X-Band generator at 9GHz. to the low-impedance varactor diode, a strip-line idler section 11 to support currents at the second harmonic and an output resonant circuit 12 to prevent the flow of third harmonic currents, in the output circuit, to Q band at 36GHz. is shown as the block X4 with a varactor symbol shunted by a self-bias resistor $R_1$ across whose terminals $T_3$, $T_4$ there is developed a self bias voltage $V_1$. An external source $V_1$ is unnecessary in self-biassed varactor multiplier since it is developed by the normal rectifier action of the varactor in response to the input power at frequency $f_o$ at terminal $T_1$. The output at $4F_o$ at terminal $T_2$ is actually derived across the varactor, as is the DC $V_1$. $V_1$ is discussed further below as one of the parameters used in explaining and designing a system.

Across the self-bias resistor $R_1$ is the compensating network following the principles of the invention and consisting of a series combination of a series resistor $R_2$, a diode, $D_2$, which may be a zener diode, and an auxiliary source $V_2$ of backing voltage, which opposes but in the stabilizing range is overcome by $V_1$. When $V_2$ is overcome $D_2$ is forward biased, but $V_2$ is directed to reverse-bias $D_2$.

The voltage-dependent-resistor characteristic of this combination may be simulated other than by a series chain, and such other arrangements fall within the scope of the invention.

Figure 2:
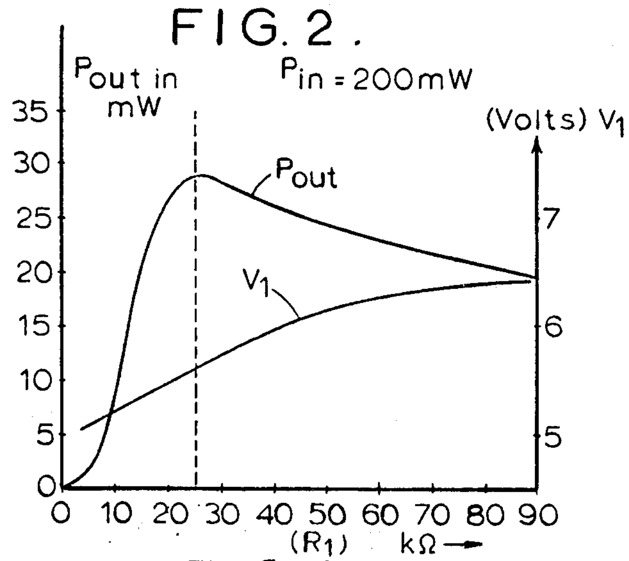
FIG. 2 is two graphs for a self-biassed fourfold multiplier showing the effects of varying the self bias resistance on the power output and the bias voltage developed.

Referring to FIG. 2 now which was plotted for a Mullard CXY 12 varactor in micropill encapsulation, and FIG. 1, it is seen that $V_1$ rises as $R_1$ is altered from 0–90 KΩ for a constant 200 mW. input power $P_{in}$, but that the power output $P_{out}$ peaks at about 30 mW. when $R_1$ is 25 KΩ, falling steeply to the left but very slowly to the right. $P_{out}$ maximized at the same $R_1$ even when $P_{in}$ was raised from 250 to 400 mW. (not plotted); $P_{out}$ was virtually proportional to $P_{in}$ also up to 400 mW. In the left region $P_{out}$ is very sensitive to $R_1$, and thus the efficacy of the compensating series chain $V_2$ $D_2$ $R_2$ is, in somewhat oversimplified terms, explicable in that small tendencies to increase in $P_{out}$ due to $P_{in}$ increases are immediately compensated by an effective reduction in $R_1$, which attenuates $P_{out}$. The anticipated mean condition $P_{in}$ and $P_{out}$ setting must be, then, that the effective $R_1$ is set somewhat below that for maximum $P_{out}$ (e.g.,) 25 KΩ in FIG. 2), so that the system is detuned in $R_1$. $P_{out}$ is thus adjustable up or down to counter opposite tendencies, as a result of $P_{in}$ variations. Clearly the mean point on the plot of $P_{out}$ in FIG. 2 should not be so far to the left that the $P_{out}$ at the desired frequency (e.g., trebled, quadrupled etc.) be too low. An output power of 15 mW. was selected for the levelled output and this lies approximately at the midpoint of the $P_{out}$-$R_1$ characteristic to the left of the maximum $P_{out}$ of FIG. 2.

Figure 3:
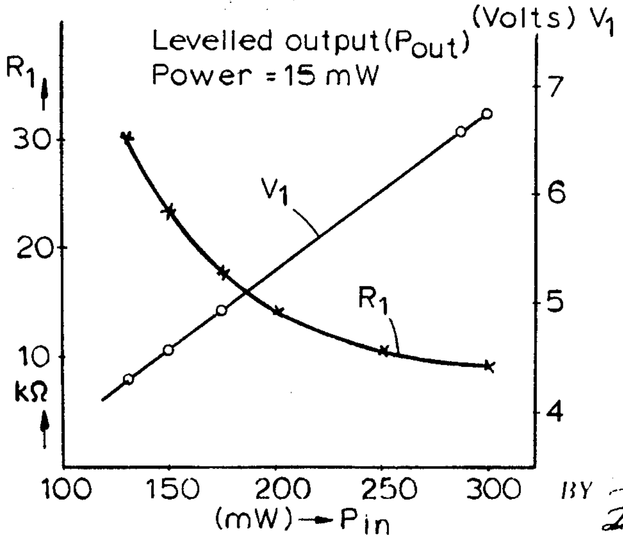
FIG. 3 shows the change in self bias resistance and consequent bias voltage as separate plots against input power from 100 mW.–300 mW. for a constant 15 mW. of quadrupled power output.

FIG. 3 shows how $V_1$ and $R_1$, vary for $P_{in}$ altering between 100–300 mW. in order to keep $P_{out}$ constant at 15 mW. $V_1$ rises linearly from about 4–6.8 volts while $R_1$ descends first steeply then less so from 30–10 KΩ. We deduced from our discovery of the salient features of these graphs that a very acceptable compensation could be achieved without undue complications.

The above graphs and description give design considerations whereby the man skilled in the art selects the component parameters. $R_1$ cannot be constant, effectively, to keep $P_{out}$ constant for $P_{in}$ varying, so that a resultant $R_1$, i.e., self bias resistance, has to be brought about which is voltage-dependent or nonlinear. In the description below, $R_1$ refers to a constant resistance value, e.g., given by a single resistor element as in the position shown in FIG. 1 and $R_2$, $D_2$ and $V_2$ are the nonlinearity introducing elements.

FIGS. 4 and 5 show graphs of $P_{out}$ against $P_{in}$ using said CXY 12 micropill varactor at 36 GHz. $P_{out}$ in said varactor multiplier. A diode of Mullard type OA 95 was used for $D_2$. $V_2$ reverse-biases $D_2$ until overcome by the generated self-bias voltage of the varactor. Referring first to FIG. 4, which shows $P_{out}$ against $P_{in}$ from 100–300 mW. for four different $V_2$ values but constant $R_1$ and $R_2$ (20 and 2.5 KΩ). For $V_2$=5.4, and 5.1 the onset of power levelling is referenced A, at 200 mW. and 160 mW. (respectively) input power, when $D_2$ is becoming forward biassed. Different stabilized $P_{out}$ values from 7 to 21 mW. or so occur as $V_2$ is adjusted from 4.1 through 4.6., 5.1 to 5.4. volts respectively. Thus the power output can be electrically selected, or even modulated (AM) by giving $V_2$ an AC component. The stabilizing reduces $P_{out}$ variations to less than 0.1 db.

The FIG. 4 values of $R_1$, $R_2$ are about ideal for the mentioned varactor, used in quadrupling to Q-band. Other $R_2$ values are shown in FIG. 5 ($R_1$ is not so critical, and 30 KΩ also gives good results, not illustrated) for a constant $V_2$ of 5 volts and the same $R_1$ as FIG. 4. It is seen that an $R_2$ of 3 KΩ results in a residual rise of $P_{out}$ with $P_{in}$ and undercompensates, whereas $R_2$=2 KΩ overcompensates. Unless these rising or falling characteristics are wanted, the levelled characteristic (from $P_{in}$=150 mW. or so upward) of 2.5 KΩ for $R_2$ is obviously at or near the ideal. Before the diode $D_2$ conducts, the curves are coincident. Onset of conduction, as can be seen, depends virtually only on $V_2$ and $P_{in}$, before this, the $P_{out}$ curve is linear with $P_{in}$ so that the conversion efficiency is constant and depends on $R_1$.

The efficiency as depicted by the results in FIG. 5 compared with the maximum available is reduced by 50 percent at the input power of 200 mW. (nearly 30 mW. $P_{out}$ in FIG. 1 for 200 mW. input).

There are many applications where $P_{out}$ must be very constant. Known methods of stabilization necessarily introduce appreciable levels of insertion loss and require expensive and bulky equipment e.g., when a Q-Band (or higher) pump source is required in a parametric amplifier, used in communication satellite applications. This invention can provide very low insertion loss, especially when only shall variations in $P_{in}$ are to be compensated, and dispenses with much of the ancillary equipment. Frequency multipliers are often used because the cost of microwave power sources rises very rapidly with frequency. Thus users can readily obtain improved power output stability by incorporating the simple, low cost auxiliary compensation network in such a system. Moreover, if required, power output stabilization against temperature can easily be achieved by temperature compensation control of the stabilizing circuit described above.

Further reference to FIG. 5 is now made; it will be seen that when $R_2$ is 3 KΩ or 2 KΩ (undercompensation and overcompensation respectively) there is a gradient, approximately, constant over quite a distance. It may be that this straight line portion is preferred not to be horizontal for some applications, and such arrangement is within the scope of the invention. It may be said that for the multiplier, the $P_{out}$ dependence on $P_{in}$ has been controlled in shape, usually a straight line, quite often horizontal.

In particular, the shaping may be deliberately controlled, not for stabilizing $P_{out}$ at one value, but for compensating the undesirable variation in response or output of another component, e.g., a microwave transmission member, or the characteristics of the utilization device fed by the multiplied $P_{out}$. A residual gradient or curve will then be very useful. An example of this follows, with reference to FIGS. 1 and 4.

The output at terminal $T_2$ is used to pump a parametric amplifier of the single port type, which requires for constant gain a constant power input (i.e., our $P_{out}$). If a varactor is used as the variable reactance element of the paramp, the signal frequency can be changed electrically by altering the bias on the varactor. This has the usually undesirable concomitent effect of altering the gain. To stabilize the overall gain, $P_{out}$ is altered according to this refinement of the invention to compensate so that stabilization in gain of the paramp is achieved whether $P_{in}$ to the multiplier (pump source) varies or if the paramp operating frequency is changed electronically.

The second is enabled by deriving the voltage for the electronic tuning from the same source as $V_2$ is derived, and by using the fact apparent from FIG. 4 that alterations in $V_2$ only retain the $P_{out}$ curve shape (in FIG. 4 flat) but alter the $P_{out}$ value for a given $P_{in}$.

A potentiometer with two tappings or two ganged potentiometers are used to provide two *interdependently* varying voltages with one control. These are so interdependent than an electronic tuning voltage increment alters $V_2$ by an amount resulting in overall gain constancy. The gain/pump power characteristic of the paramp is also relevant in getting the interdependence.

Almost certainly constant gain is required of the paramp, so $R_1$, $R_2$ are first set for the required flat $P_{out}$. Then the gain against tuning voltage characteristic of the paramp is calibrated. This is a reasonable approximation to a logarithmic curve (i.e. the gain in decibels is linear with the voltage on the tuning varactor), so that a linear dependence of $V_2$ on tuning voltage is also set up mechanically by ganging or the like. This linearity greatly facilitates the stabilization.

The desired constant paramp gain is thus provided, for tuning over a reasonable band by altering the bias on the tuning varactor. Such "single-knob" control of a paramp has not hitherto been achieved to the best of our knowledge.

The invention is thus seen to comprise any of the following paragraphs, singly or in combination.

1. A varactor frequency multiplier arrangement at or near microwave frequencies with power output-against-input shaping comprising a self-biassing resistance shunting the varactor and a power output-shaping network also shunting the varactor said network comprising appropriate nonlinear resistance.

2. An arrangement according to paragraph (1), said network comprising a diode directed to be forward biassed by the self bias, a voltage source directed to reverse bias the diode, and a resistance determining the degree of stabilization.

3. An arrangement according to the last paragraph wherein the network comprises but three components, namely said diode, said voltage source, and a resistor, all in series.

4. A varactor frequency quadrupler arrangement substantially as herein described with reference to the accompanying drawing.

5. Use of the above arrangements for electronic output power setting or amplitude modulation (as well as stabilizing) by adjustment of the voltage source.

6. A negative resistance reflection type parametric amplifier comprising the arrangement according to paragraph (1), (2), (3) or (4) as a stabilized pump source.

7. A paramp as defined in the previous paragraph comprising a first variable voltage source coupled to tune the paramp operating frequency via the paramp varactor, a second variable voltage source coupled to provide the voltage source of paragraph (2), and means coupling the first and second sources such that $P_{out}$ is not only stabilized but automatically set to compensate the sensitivity to tuning of the paramp gain (simple knob control).

I claim:

1. A frequency multiplier circuit comprising a varactor diode; a fixed self biasing resistor coupled in parallel with said varactor diode, whereby said diode is self biassed by said resistor; and voltage dependent nonlinear resistance series circuit means parallel coupled to said varactor diode for controlling the output power of said multiplier circuit including a second diode forward biassed by said self biasing resistor, a source of back biasing voltage for said second diode, and a second fixed resistor having a selected resistance value with respect to said self biasing resistor resistance value.

2. A circuit as claimed in claim 1 wherein said second diode comprises a Zener diode.

3. A circuit as claimed in claim 1 further comprising an input frequency resonant circuit coupled to said varactor and an output frequency resonant circuit coupled to said varactor diode and tuned to a multiple of said frequency.

4. A circuit as claimed in claim 1 further comprising an idler frequency resonant circuit coupled to said varactor diode.